(12) United States Patent
Smith

(10) Patent No.: US 8,387,914 B2
(45) Date of Patent: Mar. 5, 2013

(54) SOLAR THERMAL ROTORCRAFT

(75) Inventor: Timothy D. Smith, Annandale, VA (US)

(73) Assignee: Raytheon Company, Waltham, MA (US)

( * ) Notice: Subject to any disclaimer, the term of this patent is extended or adjusted under 35 U.S.C. 154(b) by 411 days.

(21) Appl. No.: 12/771,160

(22) Filed: Apr. 30, 2010

(65) Prior Publication Data

US 2011/0266397 A1 Nov. 3, 2011

(51) Int. Cl.
*B64B 1/58* (2006.01)
(52) U.S. Cl. .................. 244/97; 244/96; 244/73 C
(58) Field of Classification Search ............... 244/23 A, 244/73 R, 73 C, 119, 133, 96–99, 30, 31
See application file for complete search history.

(56) References Cited

U.S. PATENT DOCUMENTS

| | | | | |
|---|---|---|---|---|
| 1,866,079 | A * | 7/1932 | Blondin | 244/31 |
| 3,220,671 | A * | 11/1965 | Ashman et al. | 244/31 |
| 3,565,368 | A * | 2/1971 | Byron et al. | 244/31 |
| 4,361,297 | A * | 11/1982 | Pommereau et al. | 244/97 |
| 4,403,755 | A * | 9/1983 | Gutsche | 244/53 R |
| 4,986,494 | A * | 1/1991 | Tockert | 244/96 |
| 6,119,979 | A * | 9/2000 | Lee et al. | 244/97 |
| 6,616,094 | B2 | 9/2003 | Illingworth | |
| 7,267,300 | B2 | 9/2007 | Heath et al. | |
| 8,033,497 | B2 * | 10/2011 | Kwok et al. | 244/5 |
| 2009/0314879 | A1 * | 12/2009 | Kwok et al. | 244/29 |
| 2011/0101155 | A1 * | 5/2011 | Smith | 244/12.1 |

OTHER PUBLICATIONS

"Stratospheric Persistent UAS: Global Observer", AeroVironment, Inc., 2010. http://www.avinc.com/uas/stratospheric/global_observer/, 2 pages (last visited, Apr. 26, 2010).
"UAS Advanced Development: Pathfinder Plus", AeroVironment, Inc., 2010. http://www.avinc.com/uas/adc/pathfinder_plus/, 1page (last visited, Apr. 26, 2010).
"High Altitude Airship (HAA)—Global Persistent ISR", Lockheed Martin MS2, Defense and Surveillance Systems, Akron, OH, 2008. http://www.lockheedmartin.com/data/assets/ms2/High_Altitude_Airship_productcard.pdf, 2 pages (last visited, Apr. 26, 2010).
"DARPA's Vulture: What Goes Up, Needn't Come Down", Defense Industry Daily, Sep. 30, 2009. http://www.defenseindustrydaily.com/DARPAs-Vulture-What-Goes-Up-Neednt-Come-Down-04852/, 7 pages (last visited, Apr. 26, 2010).
"UAS Advanced Development: Helios", AeroVironment, Inc., 2010. http://www.avinc.com/uas/adc/helios/, 1 page (last visited, Apr. 26, 2010).
"Orion HALL", Aurora Flight Sciences Corporation, 2010. http://www.aurora.aero/AdvancedConcepts/Orion.aspx, 2 pages (last visited, Apr. 26, 2010).

* cited by examiner

*Primary Examiner* — Philip J Bonzell
(74) *Attorney, Agent, or Firm* — Daly, Crowley, Mofford & Durkee, LLP

(57) ABSTRACT

A vehicle includes a housing having a wall with a central port and radial port formed at a lower portion of the housing, a blower disposed within the housing to move air through the central port, a distributor coupled to the blower to distribute air inside the housing, a heat-absorbing body disposed within the housing to absorb thermal energy, and at least one arm coupled to the housing.

43 Claims, 15 Drawing Sheets

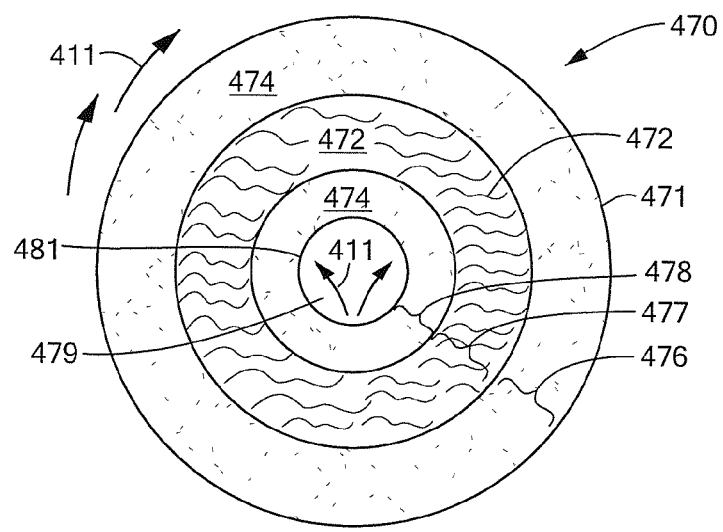
*FIG. 4C*
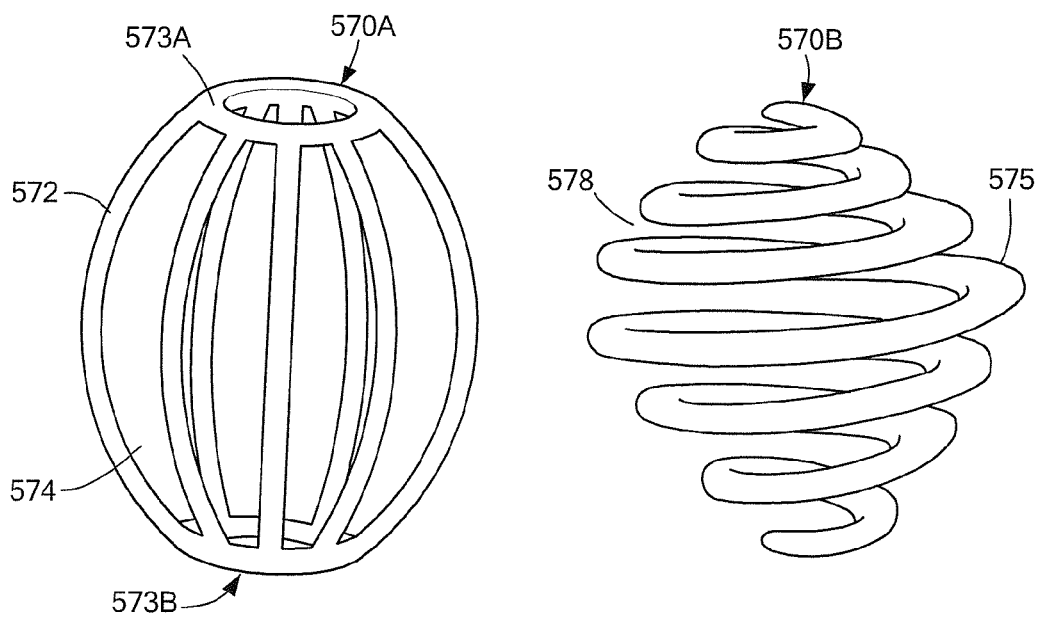
*FIG. 5A*  *FIG. 5B*

SOLAR THERMAL ROTORCRAFT

FIELD OF THE INVENTION

The inventive systems and methods generally relate to rotorcraft and, in particular, to providing high-altitude solar thermal rotorcraft.

BACKGROUND

As is known in the art, traditional spacecraft are prone to many production and deployment-related problems. For example, production facilities can take many years (or even decades) to develop and deploy military and commercial spacecraft. By launch time, many spacecraft have outdated and/or are obsolete components because of technology advances during long development periods. Spacecraft are known to be vulnerable to launch failures, software engineering defects (i.e., software bugs), and component malfunctions which can further delay development and result in cost-overruns. To prevent catastrophic failures, designers build redundancy into spacecraft systems, which adds weight, space, and cost to the overall system.

As is also known in the art, military and commercial ventures, operations, and missions are highly vulnerable to loss of key spacecraft due to attack, space weather, and/or malfunction. In recent years, military and commercial industries have proposed and produced a new class of high-altitudes vehicles, so called "virtual satellites" or "pseudolites", which are designed to be flexible, relatively low-cost, interchangeable, and reusable. Some virtual satellites are capable of rapid deployment and breakdown and may be deployed in multi-vehicle networks for a variety of military and commercial applications.

Virtual satellites offer advantages over traditional spacecraft. For example, virtual satellite vehicles can be built and launched within weeks, or even days, and technicians can rapidly assemble and deploy replacement vehicles (e.g., by using off-the-shelf components that are readily assembled from plug-and-play equipment) in response to a loss of an individual vehicles. Virtual satellites are relatively inexpensive to produce, interchangeable, and can hold different types of payloads which when combined offer more operational responsiveness and flexibility, especially when compared with the significant engineering and managerial challenges associated with multiple payloads (e.g., multiple sensing payloads a single-spacecraft having) on a single spacecraft.

SUMMARY

In general overview, the systems and methods described herein provide a vehicle including a multi-stage solar-thermal engine having a compressor stage in which air about the vehicle is drawn inside the vehicle, a heating stage in which a heat-absorbing body absorbs radiant energy (such as sunlight) to heat and expand the air flowing about the body, and a primary turbine stage in which the heated air is directed about the vehicle to produce a lift and a torque force. The heated air mixes with ambient air about the vehicle and creates an updraft plume. A secondary turbine extracts energy from the plume to create additional life and torque.

In some embodiments, the systems and methods provide an in-atmosphere vehicle (i.e. a so called "virtual satellite") to support a variety of military and/or business operations including, but not limited to, communications, intelligence, surveillance and reconnaissance (ISR), remote sensing, and/or atmospheric sensing. The vehicle may optionally provide a platform capable of remaining on-station at high altitudes (e.g., 100,000 feet) for very long periods (e.g., weeks, months, and/or years) carrying significant payloads (e.g., 1000 kilograms).

In further embodiments, an in-atmosphere vehicle includes a pressurized, transparent spherical housing that includes a material capable of absorbing solar energy and transferring the energy to the air inside the vehicle. The material may be disposed within a variety of structures to capture and distribute solar energy. As by way of non-limiting examples, the structures may include a web and/or a curtain-like arrangement to efficiency capture and distribute solar energy. These structures may include solar-cells to provide electric power to on-board systems and/or recharge batteries.

In some embodiments, a blower located at a lower portion of the vehicle housing draws in cold air from outside the vehicle that is heated and vented via radial ports to produce a lift and a torque force to rotate and support and/or ascend the vehicle. Arms mounted to the surface of the housing generate additional lift and torque.

In still other embodiments, the vehicle has modes of operation which depend on radiant energy and/or stored thermal energy to power the vehicle. In a first mode in which the vehicle is exposed to radiant energy, the heat-absorbing material absorbs and transfers thermal energy to air distributed inside the vehicle. During this mode, the vehicle may ascend in the atmosphere as jet nozzles vent heated air about the vehicle to provide lift and torque. In a second mode, which may be triggered by an absence or reduction in radiant energy exposure (e.g., the vehicle may move at least partially into the shadow of a large body such as the Earth or a large vehicle), the heat-absorbing material releases thermal energy stored during the first mode to continue heating and venting air and providing lift and torque. In some embodiments, the vehicle slowly descends in the Earth's atmosphere in the second mode and the rate of descent may optionally be controlled to so that a net loss in altitude is equal to a net gain in altitude during the first mode of operation. In this way, the vehicle exploits potential energy gained during vehicle ascent to remain at on-station indefinitely.

In one aspect, a vehicle includes a housing having a wall with a central port and radial port formed at a lower portion of the housing, a blower disposed within the housing to move air through the central port, a distributor coupled to the blower to distribute air inside the housing, a heat-absorbing body disposed within the housing to absorb thermal energy, and at least one arm coupled to the housing.

In a further embodiment, the vehicle includes one or more of the following features: the housing wall includes a material capable of communicating energy of the sun; the housing wall material is further capable of insulating the area inside the housing from loss of thermal energy; the housing wall includes a first transparent layer, a second transparent layer, and a thermal insulating layer disposed between the first and second transparent layers; at least one of the first or second transparent layers includes at least one of a clear Mylar®, plastic, glass, polycarbonate, or acrylic; the housing is spherical; the central port is formed at the bottom end of the housing and is circular having a center point coincident with an axis of symmetry of the housing about which the vehicle rotates; the blower includes an axial fan; the distributor has a wall forming ports to move air inside the housing; the distributor includes an elongated tube having a longitudinal axis coincident with an axis of symmetry of the housing about which the vehicle rotates; the elongated tube is tapered from an end of the elongated tube proximate to the blower to a portion of the elongated tube distal to the blower; the distributor includes a spherically shaped inner housing having a wall forming ports to move air centrally inside the housing and an elongated tube coupled at one end to the blower and at an opposite end to the spherically shaped inner housing; an air supply tube extending outward from a bottom end of the housing and configured to provide heated air to the central port; the heat-absorbing body is configured to store thermal energy and to release thermal energy; the heat-absorbing body houses a material to store thermal energy and release thermal energy into the housing; the material includes water; the heat-absorbing body includes a web-like structure configured to absorb thermal energy inside the housing; the web-like structure includes a structural body distributed evenly within the housing and a heat-absorbing material coupled to the structural body; the heat-absorbing body includes a tree-like structure configured to absorb thermal energy inside the housing; the radial port includes an elongated tube extending from the outer surface of the housing wall to direct air about the vehicle; the elongated tube tapers outwardly from the housing wall; the radial port is a plurality of radial ports; the arm is coupled to the outer surface of the housing wall; the arm is a plurality of arms; a heat-absorbing body cover configured to decrease heat loss from the heat-absorbing body; a plurality of elongated elements coupled to the heat-absorbing body cover and the elongated elements are unwound and wound about a plurality of motorized spools to extend and retract the heat-absorbing body cover; the distributor is configured to extend the heat-absorbing body cover by forcing air against a surface of the heat-absorbing body cover, and; the heat-absorbing body cover is extended proximate to the inner surface of the housing wall.

In another aspect, a method of vehicle hovering includes providing a vehicle having a housing with a wall forming a central port and a radial port, moving air from outside a vehicle through the central port using a blower disposed proximate to the central port, moving air from the blower into a distributor having a wall forming at least one distributor port, moving air through the at least one distributor port into an area inside the housing to communicate air about a heat-absorbing body disposed within the housing and heated using radiant energy, moving heated air through the radial port about the vehicle, and moving air about the vehicle past at least one arm coupled to the housing wall.

In further embodiments, the method includes one or more of the following features: said moving air from outside the vehicle further includes forming the central port at a bottom end of the housing wall and aligning the center port with a central axis of the vehicle; said moving air from the blower into the distributor further includes moving air into an elongated tube having a longitudinal axis coincident with a central axis of the vehicle and a radius tapering from the bottom end of the housing to the top end of the housing; the heat-absorbing body further includes a material to store and release the radiant energy and said communicating air about the heat-absorbing body further includes cooling the heat-absorbing body; said moving heated air through the radial port about the vehicle further includes moving heated air through an elongated tube having one end coupled to the housing wall and tapering distally from the one end; said moving heated air through the radial port about the vehicle further includes providing a thrust force to lift the vehicle and a torque force to rotate the vehicle about a central axis; said moving air about the vehicle past at least one arm further includes providing a portion of the thrust force and a portion of the torque force; the housing wall includes a transparent material, further including communicating radiant energy from outside the vehicle into the housing through the transparent material; the housing wall includes a first transparent layer, a second transparent layer, and an insulating layer disposed between the first and second transparent layers, further including communicating radiant energy inside the housing through the first and second transparent layers; and reducing heat loss from inside the housing using the insulating layer; further including covering the heat-absorbing body to decrease heat loss based upon a first predetermined condition related to radiant energy about the vehicle and uncovering the heat-absorbing body based upon a second predetermined condition related to radiant energy about the vehicle; the first predetermined condition corresponds to a first temperature inside the housing and the second predetermined condition corresponds to a second temperature inside the housing; further including increasing an altitude of the vehicle during a first period when the heat-absorbing body absorbs thermal energy; further including decreasing an altitude of the vehicle during a second period when the heat-absorbing body releases thermal energy; further including comparing an increase an altitude during the first period with a decrease in altitude during the second period, and; said comparing further includes decreasing a difference between the increase in altitude during the first period and the decrease in altitude during the second period to reduce a net loss in vehicle altitude.

In a further aspect, a rotorcraft includes a spherical housing having a wall with a central port and radial port formed at a lower portion of the housing, the wall to communicate radiant energy, the wall including a transparent outer layer, a transparent inner layer, and an insulating layer disposed between the transparent outer layer and the transparent inner layer. The rotorcraft also includes a blower disposed within the housing to move air through the central port, a heat-absorbing body disposed within the housing to absorb a portion of communicated radiant energy as thermal energy, the heat-absorbing body including a heat-absorbing material to absorb thermal energy and a phase-changing material coupled to the heat-absorbing material to store and release thermal energy. The rotorcraft also includes at least one arm coupled to the housing.

In a further embodiment of the rotorcraft, the heat-absorbing body includes an opening proximate to the blower to distribute air about the heat-absorbing body to cool the heat-absorbing body, the radial port communicates air about the vehicle to provide a portion of a vehicle thrust to lift the vehicle and a portion of a vehicle torque to rotate the vehicle about a central axis, and air about the vehicle acts on the at least one arm to provide another portion of the vehicle thrust and another portion of the vehicle torque.

BRIEF DESCRIPTION OF THE DRAWINGS

The foregoing features of the systems and methods described herein may be more fully understood from the following description of the drawings in which:

FIG. 4C is a pictorial representation of a close-up cross-sectional view of yet another embodiment of a heat-absorbing body;

FIG. 5A is a pictorial representation of an embodiment of a heat-absorbing body;

FIG. 5B is a pictorial representation of another embodiment of a heat-absorbing body;

DETAILED DESCRIPTION

Figure 1:
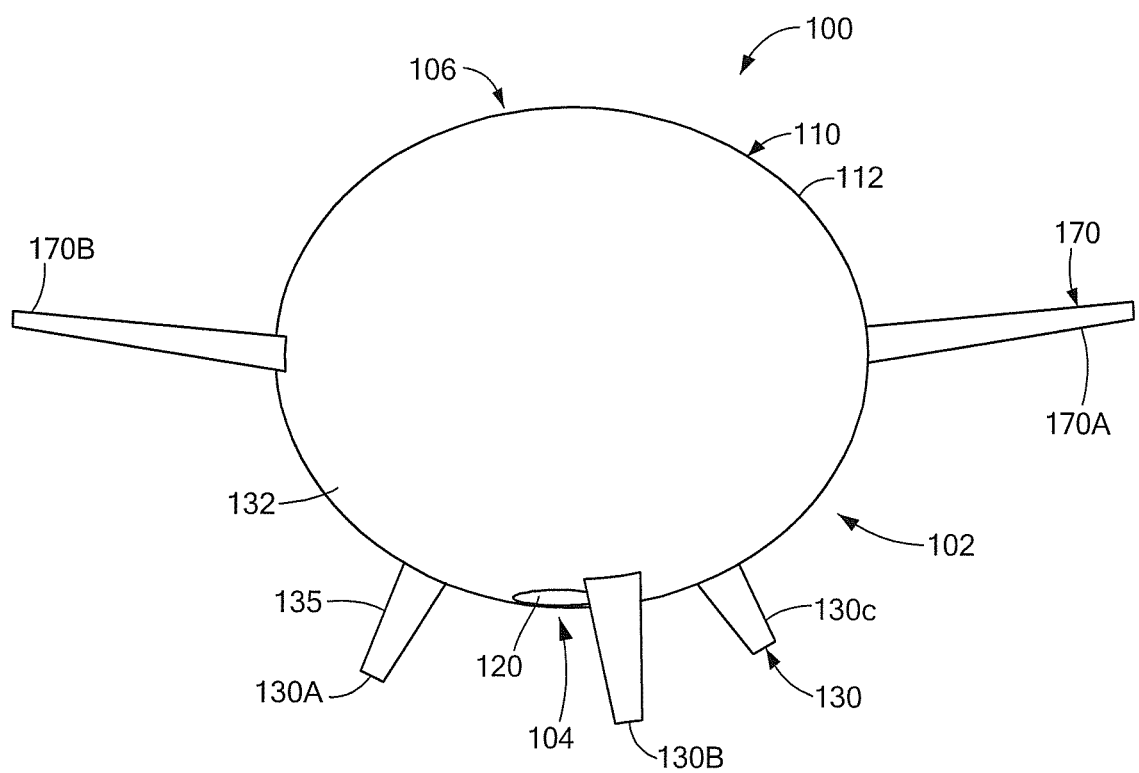
FIG. 1 is a pictorial representation of an embodiment of a vehicle according to the systems and methods described herein.
Figure 1A:
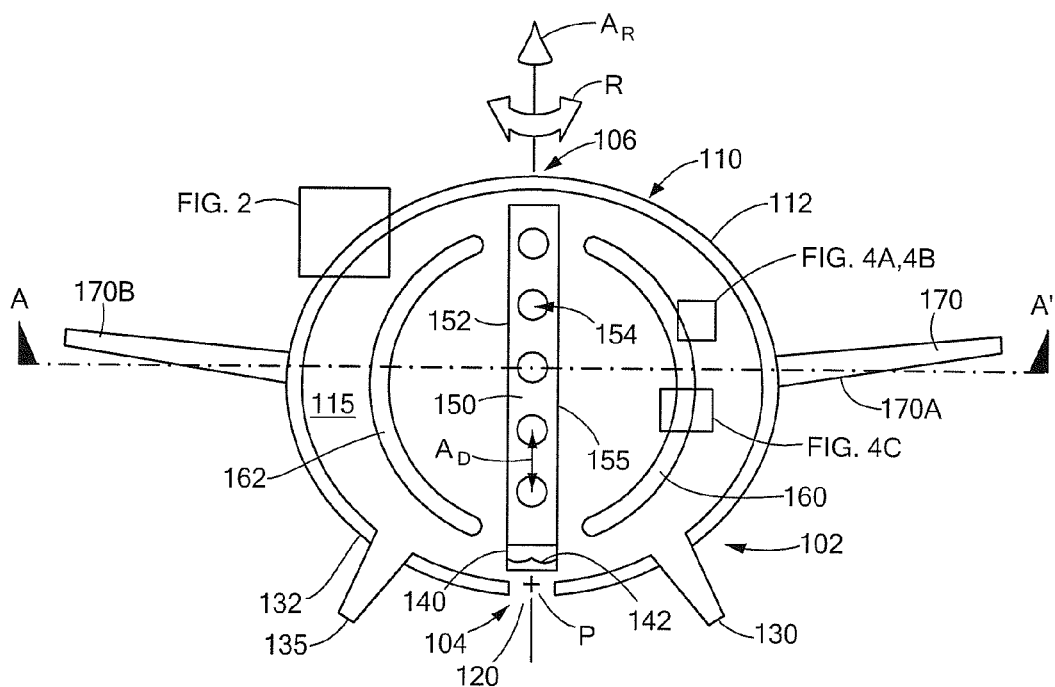
FIG. 1A is a cross-sectional view through a central inside portion of the vehicle embodiment of FIG. 1.
Figure 1B:
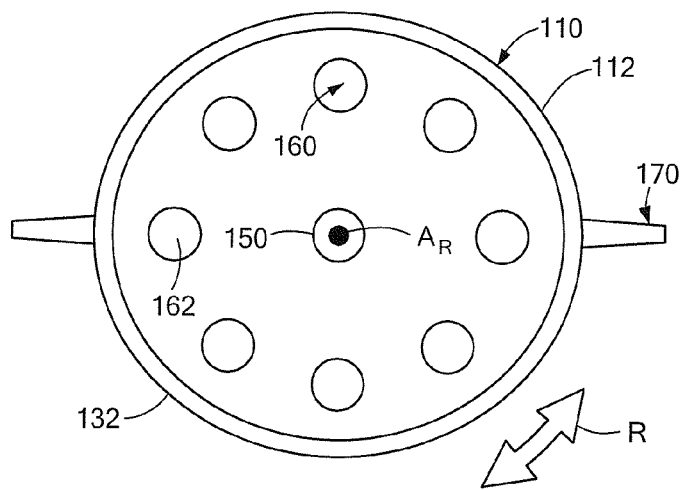
FIG. 1B is a top view of the vehicle embodiment of FIG. 1 shown at line AA' of FIG. 1A.

Referring now to FIGS. 1, 1A, and 1B, in which like elements are shown with like reference numerals, an embodiment of a vehicle 100 (shown in perspective view in FIG. 1, in cross-sectional view through a central inside portion 115 in FIG. 1A, and in top view in FIG. 1B through line AA' of FIG. 1A) includes a housing 110 having a wall 112 with a central port 120 and radial port (generally designated by reference numeral 130) formed at a lower portion 102 of the housing 110. The vehicle 100 includes a blower 140 disposed within the housing 110 to move air through the central port 120, a distributor 150 coupled to the blower 140 to distribute air inside the housing 110, a heat-absorbing body 160 disposed within the housing 110 to absorb thermal energy, and at least one arm (generally designated by reference numeral 170) coupled to the housing 110.

In a further embodiment, the central port 120 is formed at the bottom end 104 of the housing 110 and is circular having a center point P that is coincident with an axis of symmetry $A_R$ of the housing 110 about which the vehicle 100 rotates (designated by arrow R). In the same or different embodiment, the vehicle housing 110 is spherical, which can help the housing wall 112 withstand differences between internal and external pressure and aid in vehicle integrity.

In some embodiments, the blower 140 includes an axial fan which is a rotating body of foils (generally denoted by reference numeral 142) aligned in a plane orthogonal to an axis of foil rotation which in further embodiments is coincident with the axis of symmetry $A_R$. The rotating foils 142 transfer rotational motion into thrusts of air accelerated behind the foils 142 and parallel to the axis of rotation. In this way, the foils 142 draw in air about the vehicle housing 110 through the central port 120 and accelerate the air in an axial direction toward the distributor 150.

In another embodiment, the distributor 150 has a wall 152 forming a plurality of ports (an example of which is designated by reference number 154) to move air inside the housing 110. In a further embodiment, the distributor 150 includes an elongated tube 155 having a longitudinal axis $A_D$ coincident with the housing axis of symmetry $A_R$.

In a further embodiment, the radial port 130 includes an elongated tube 135 extending from the outer surface 132 of the housing wall 112 to direct air about the vehicle 100. In still a further embodiment, the elongated tube 135 tapers outwardly from the housing wall 112.

In some embodiments, the radial port 130 is a plurality of radial ports. FIG. 1 shows a first radial port 130A, a second radial port 130B, and a third radial port 130C (i.e., three radial ports). However, vehicle 100 should not be construed as limited to three ports 130A, 130B, 130C, but can include any number of radial ports 130 as desired, needed, or necessary (e.g., two radial ports, four, five, 10, 100, etc.).

In another embodiment, the arm 170 is coupled to the outer surface 132 of the housing wall 112 and/or includes a plurality of arms. For example, FIG. 1 shows a first arm 170A and a second arm 170B. However, vehicle 100 should not be construed as limited to two arms 170A, 170B, but can include any number of arms as desired, needed, or necessary (e.g., three arms, four, five, 10, 100, etc.).

As can be seen in FIGS. 1A and 1B, the heat-absorbing body 160 is a structure distributed about the inside portion of the housing 115. The heat-absorbing body 160 includes multiple curved elements (an example of which is designated by reference numeral 162) which follow the contour of the housing wall 112 and are distributed evenly about the distributor 150. Further, the curved elements 162 may optionally be joined via a first round element at the top portion 106 of the housing 110 and/or a second round element at the bottom portion 104 of the housing 110. The heat-absorbing element 160 should not be construed as limited to the above-described structural configuration. Other exemplary structural configurations will be described hereinafter.

In some embodiments, the blower 140 is configured to distribute air about the inside portion of the vehicle 115. These embodiments may optionally include air foils coupled to the blower 140 to redirect and distribute air more evenly throughout the inside portion of the vehicle 115. These embodiments may optionally include distributor 150.

Figure 2:
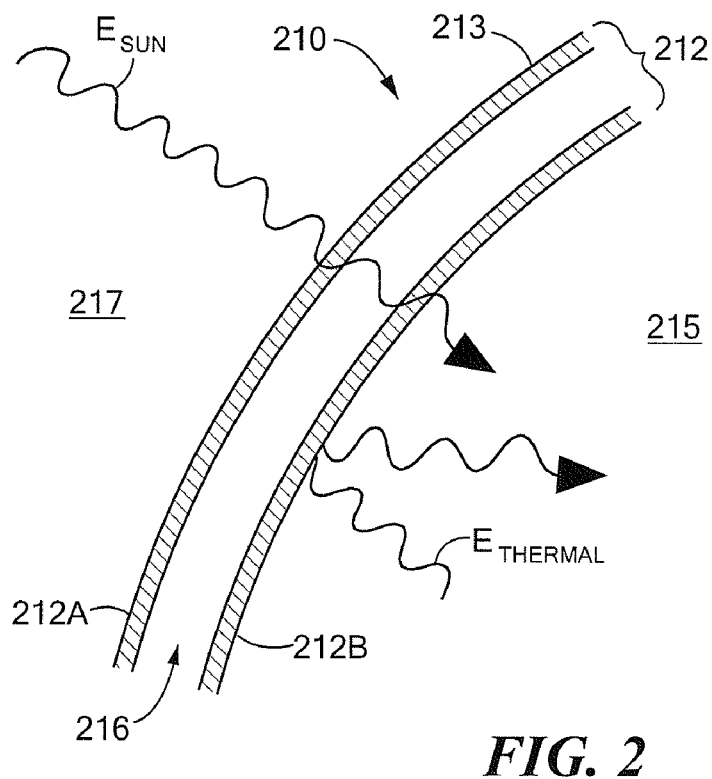
FIG. 2 is pictorial representation of a close-up cross-sectional view of an embodiment of a housing wall.

Referring now to FIG. 2 showing a close-up portion of a housing wall 212 (as may be similar to housing wall 112 described in conjunction with FIGS. 1, 1A, and 1B), in some embodiments the housing wall 212 includes a material 213 capable of communicating energy of the sun (designated by $E_{SUN}$) from outside the housing 217 to an area inside the housing 215. In a further embodiment, the material 213 is further capable of insulating the area inside the housing 215 from loss of thermal energy (designated by $E_{THERMAL}$).

In some embodiments, the housing wall 212 includes a first transparent layer 212A, a second transparent layer 212B, and a thermal insulating layer 216 disposed between the first and second transparent layers 212A, 212B. In such a configuration, transparent layers 212A, 212B provide a housing wall 212 capable of communicating the energy of the sun into the vehicle 200 while at the same time enclosing an insulating layer 213 that tends to reduce thermal heat loss. In a further embodiment, at least one of the first or second transparent layers 212A, 212B includes a clear insulator material capable of surviving very cold temperatures experienced at high-altitude of the Earth's surface and/or in space as well as very hot temperatures experienced inside the heated housing. The transparent layers 212A, 212B may also be lightweight yet strong and/or flexible enough to withstand internal pressure forces and provide vehicle integrity. In some embodiments, at least one of the first or second transparent layers 212A, 212B includes a clear Mylar®, acrylic, plastic, polycarbonate, and/or glass. In the same or different embodiment, the insulting layer 213 includes air.

Figure 3A:
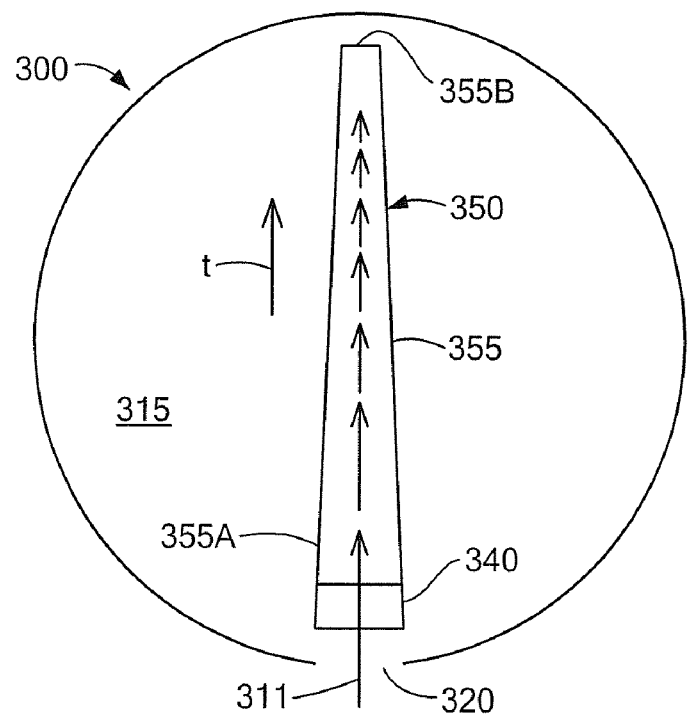
FIG. 3A is a pictorial representation of a cross-sectional view of an embodiment of a distributor.

Referring now to FIG. 3A showing a cross-sectional view of a central inside portion 315 of another vehicle embodiment 300, a distributor 350 (as may be similar to distributor 150 discussed conjunction with FIGS. 1, 1A, and 1B) includes an elongated tube 355 that is tapered t from an end 355A of the elongated tube 355 proximate to the blower 340 to a portion 355B of the elongated tube 355 distal to the blower 340. The tapered elongated tube 355 accelerates air 311 received from the central port 320 and passed through the axial fan 340 toward portion 355B of the elongated tube 355, which can help distribute the air 311 evenly and rapidly throughout the inner housing portion 315.

Figure 3C:
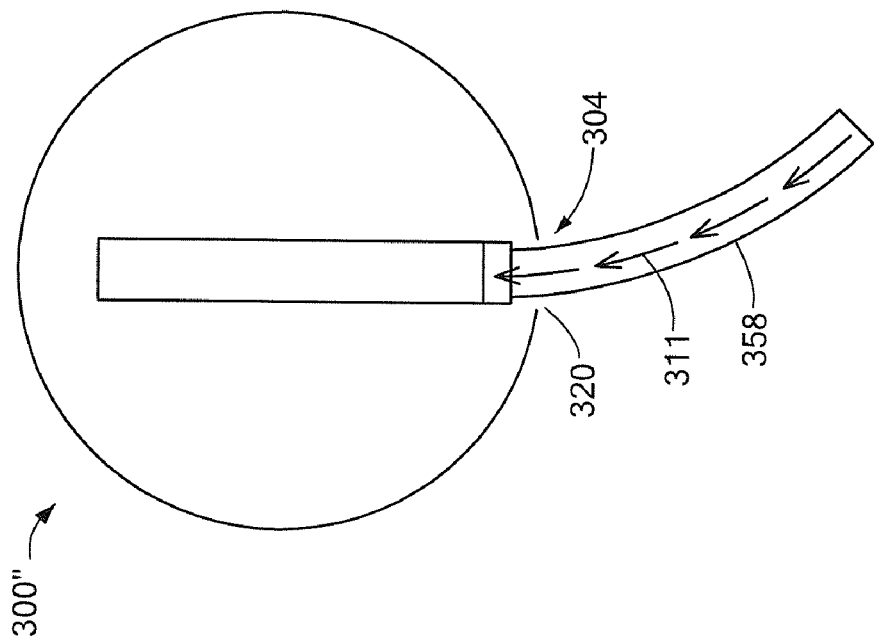
FIG. 3C is a pictorial representation of a cross-sectional view of an embodiment of an air supply body.
Figure 3B:
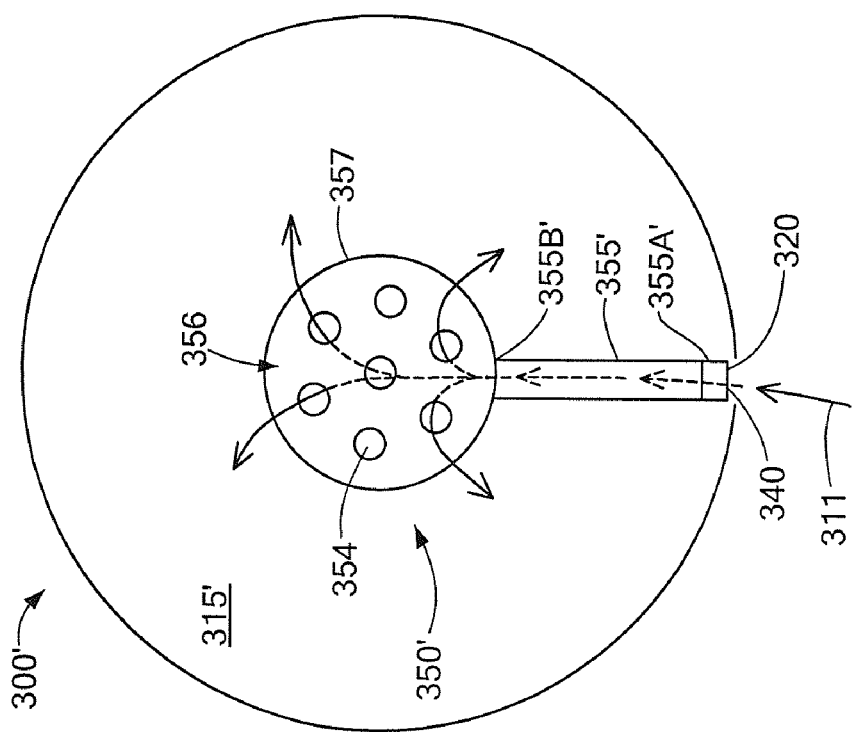
FIG. 3B is a pictorial representation of a cross-sectional view of another embodiment of a distributor.

Referring now to FIG. 3B exposing a view of a central inside portion 315' of yet another vehicle embodiment 300', a distributor 350' (as may be similar to distributor 150 discussed conjunction with FIGS. 1, 1A, and 1B) includes an elongated tube 355' coupled at one end 355A' to the blower 340 and at an opposing end 355B' to a spherically shaped inner housing 356 having a wall 357 forming a plurality of ports (an example of which is designated by reference numeral 354) to move air 311 centrally inside the housing 315'. The spherically shaped inner housing 356 tends to distribute air 311 in multiple directions throughout the inner housing 315'.

Referring now to FIG. 3C showing a cross-sectional view of another vehicle embodiment 300", an air supply tube 358 extends outward from a bottom end 304 of the housing 312. When including a heat-absorbing material, to the air supply tube can provide heated air 311 to the central port 320. For example, the air supply tube 358 may include a dark material that tends to heat up as it absorbs radiant energy from the Sun. The heated dark material transfers heat to the air 311 inside the tube 358 and the heated air tends to be drawn up into the vehicle 300" via the central port 320.

Figure 4A:
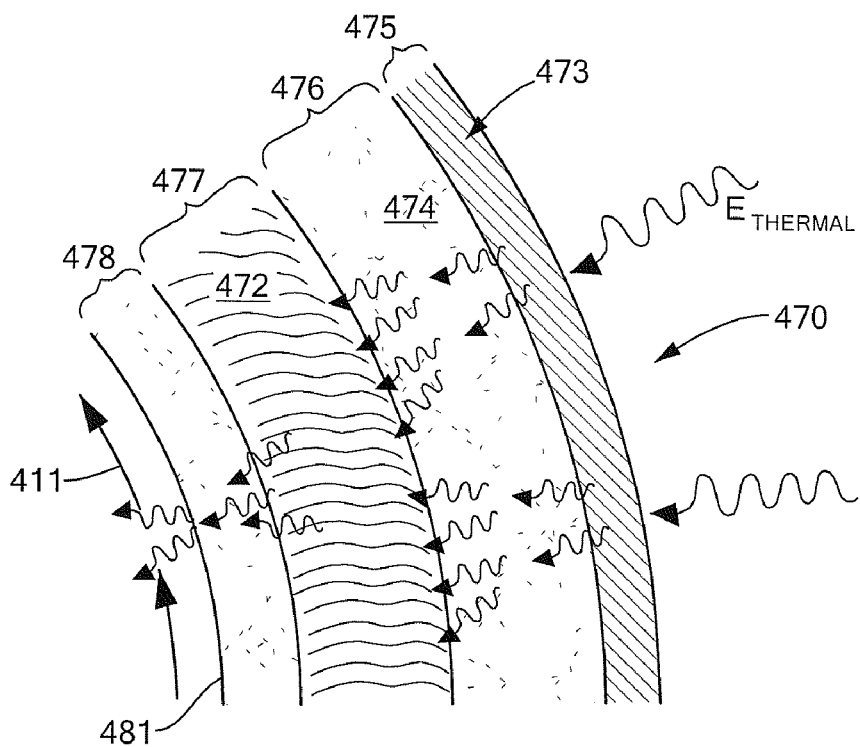
FIG. 4A is a pictorial representation of a close-up cross-sectional view of an embodiment of a heat-absorbing body.
Figure 4B:
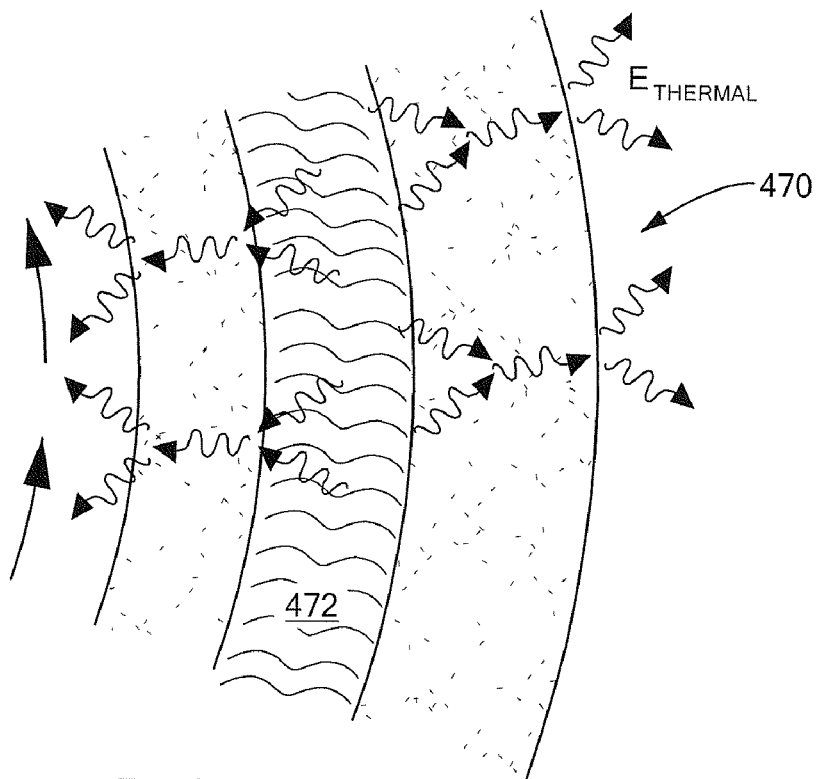
FIG. 4B is a pictorial representation of a close-up cross-sectional view of another embodiment of a heat-absorbing body.

Referring now to FIGS. 4A and 4B showing close-up views of a further embodiment 470 of the heat-absorbing body 160 of FIG. 1, in a first mode of operation illustrated in FIG. 4A the heat-absorbing body 470 is configured to store thermal energy $E_{THERMAL}$ and in a second mode of operation illustrated in FIG. 4B the heat-absorbing body 470 is configured to release thermal energy $E_{THERMAL}$. Heat-absorbing body 470 includes a phase-changing material 472, which may be distributed as a first layer 477 of the heat-absorbing body 470. In the first mode of operation, the phase-changing material 472 is configured to absorb and store thermal energy $E_{THERMAL}$ received from the Sun's radiant energy communicated into the inner area of the housing via the housing wall. In the second mode of operation, the phase-changing material 472 is configured to the release the thermal energy $E_{THERMAL}$ stored during the first mode of operation. In a further embodiment, the phase-changing material 472 includes water and/or a water-based solution (such as a saline solution) that exists in a first phase (e.g., steam) in the first mode of operation and in a second phase (e.g., water) in the second mode of operation.

The heat-absorbing body 470 may optionally include a heating material 473, which may be distributed as a second layer 475 of the heat-absorbing body 470 to absorb thermal energy $E_{THERMAL}$ during the first mode of operation. Heating material 473 may include a material capable of efficiently absorbing and transferring thermal energy $E_{THERMAL}$ to the phase-changing material 472. In some embodiments, the heating material 473 is disposed on a surface of the heating-absorbing body 470 facing the housing wall, which tends to increase heating material exposure to radiant energy. In some embodiments, heating material 473 is a dark-colored material that tends to absorb the Sun's radiant energy.

In a further embodiment, the heat-absorbing body 470 includes a cooling material 474, which in some embodiments is distributed as a third layer 476 between the first layer 475 and the second layer 477 of the heat-absorbing body 470 and/or as a fourth layer 478 distributed along the inner surface 481 of the heat-absorbing body 470 and proximate to the phase-changing material 472. The cooling material 474 is configured to distribute air 411 to contact the phase-changing material 472. In the first mode of operation, the cooling material 474 can help cool the phase-changing material 472 and, in some instances, prevent the heat-absorbing body 470 from overheating. In the second mode of operation, the cooling material 478 can help distribute air 411 heated by the thermal energy $E_{THERMAL}$ and released by the phase-changing material 472. In some embodiments, the cooling material 478 includes a low density material, such as a foam material, capable of providing flowing air 411.

Referring now to FIG. 4C, in which like elements of FIGS. 4A and 4B are shown with like reference numerals, in another embodiment the heat-absorbing body 470 forms a hollow tube which includes a first layer 476 distributed along the outer surface 471 of the heat-absorbing body 470 and including a cooling material 474, a second layer 478 distributed along the inner surface 481 of the heat-absorbing body 470 and including the cooling material 474, and a third layer 477 intervening between the first and second layer 476, 478 and including a phase-changing material 472. In this configuration, air 411 is distributed through a hollow inner portion 479 and/or along the outer surface 471. The distributed air 411 passes through the cooling material 474 to the phase-changing material 472 to heat the phase-changing material 472 (such as during the first mode of operation described in conjunction with FIG. 4A) and/or to absorb stored heat from the phase-changing material 472 (such as during the second mode of operation described in conjunction with FIG. 4B).

Referring now to FIGS. 5A and 5B, a first embodiment 570A and a second embodiment 570B of a heat-absorbing body are illustrated. In FIG. 5A, the heat-absorbing body 570A is a ball-shaped shell having longitudinal portions 572 coupled to each other along top and bottom poles (573A, 573B) of the ball. The ball-shaped embodiment 570A facilitates air to flow inside and outside the shell through the gaps 574 formed between the longitudinal portions 572. In FIG. 5B, the heating-absorbing body 570B forms a spiral coil with a maximum radial extent about the equator 575. The spiral coil embodiment 570B facilitates air flow inside and outside the coil through gaps 578 formed between the curved elements.

Figure 6A:
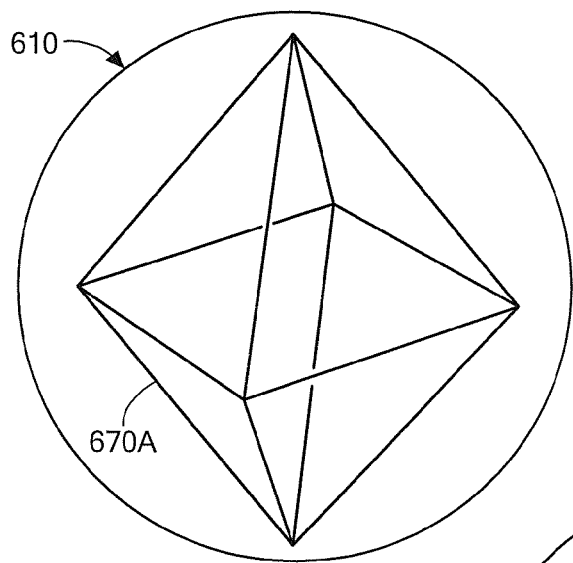
FIG. 6A is a pictorial representation of an embodiment of a heat-absorbing body having a web-like structure.
Figure 6B:
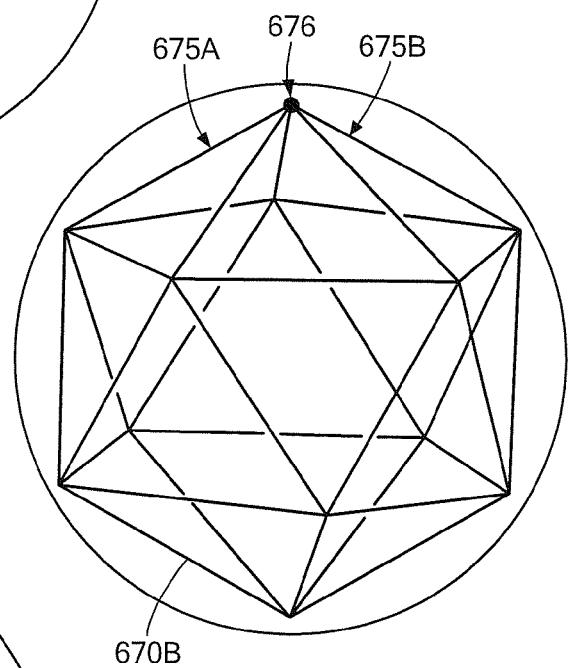
FIG. 6B is a pictorial representation of another embodiment of a heat-absorbing body having a web-like structure.
Figure 6C:
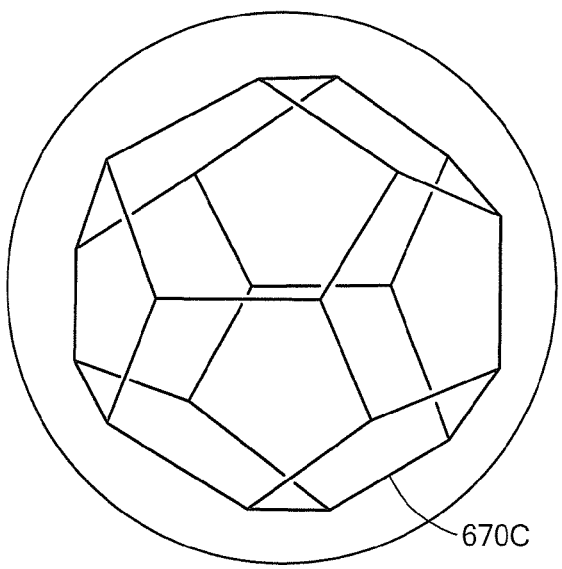
FIG. 6C is a pictorial representation of yet another embodiment of a heat-absorbing body having a web-like structure.

Referring now to FIGS. 6A, 6B, and 6C, other heat-absorbing body embodiments 670A, 670B, 670C include web-like structures disposed within a spherically shaped vehicle housing 610. Each of these web-like structures 670A-C includes arms (examples of which are designated by reference numerals 675A and 675B) joined to each other at nodes (an example of which is designated by reference numeral 676). The arms 675A, 675B and nodes 676 are distributed about an outer extent of the web-like structure (for example, 670B) to form plutonic shapes. In particular, embodiment 670A forms an octahedron (having 8 faces), embodiment 670B forms an icosahedron (having 20 faces), and embodiment 670C forms a dodecahedron (having 12 faces). Generally, the more complex the plutonic solid the more surface area of the heat-absorbing body that can come into contact with flowing air, which can improve energy absorption, storage, and release.

Figure 7A:
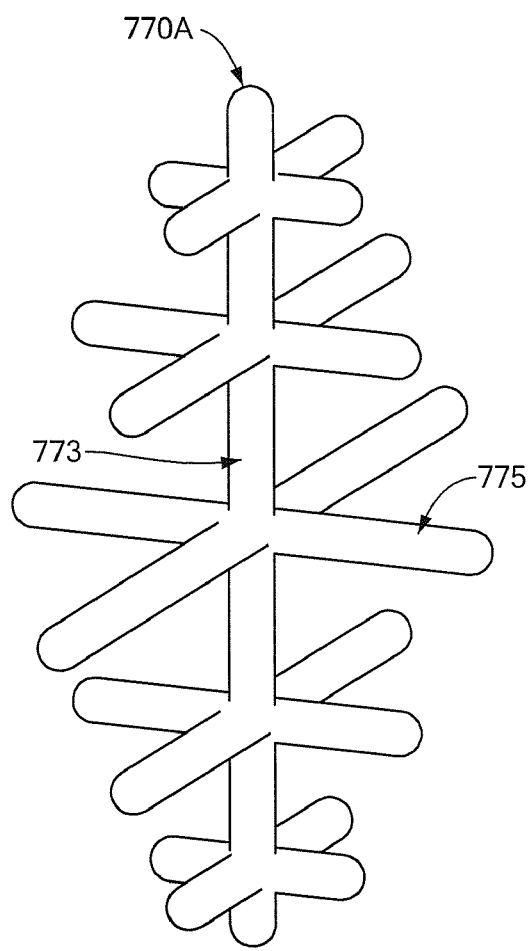
FIG. 7A is a pictorial representation of embodiment of a heat-absorbing body having a tree-like structure.
Figure 7B:
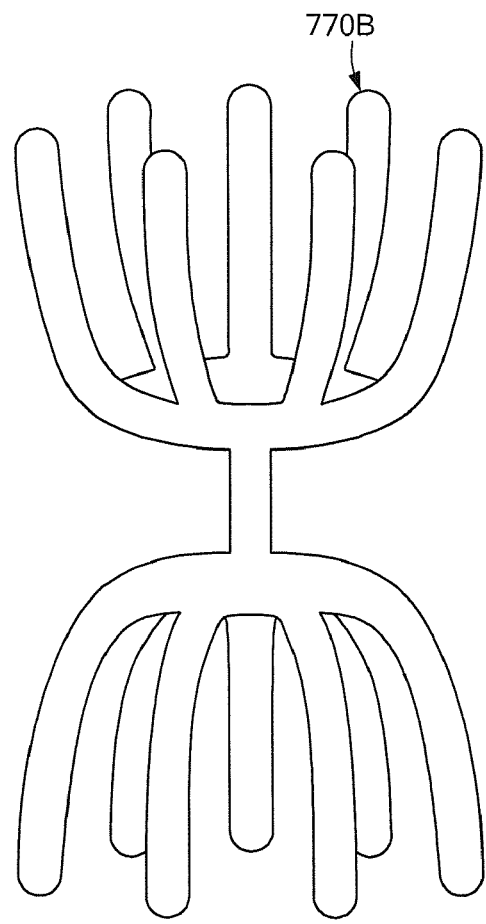
FIG. 7B is a pictorial representation of another embodiment of a heat-absorbing body having a tree-like structure.

Referring now to FIGS. 7A and 7B, still other heat-absorbing body embodiments 770A, 770B include tree-like structures including branches (an example of which is designated by reference numeral 773) and sub-branches (an example of which is designated by reference numeral 775). Much like the branches on a tree maximize leaf distribution and exposure to sun light energy, the tree-like structures are configured to maximize heat-absorbing body distribution and exposure to sun light energy (as well as to air flow about the structures).

The heat-absorbing body should not be construed as limited to the above-described examples.

Figure 8A:
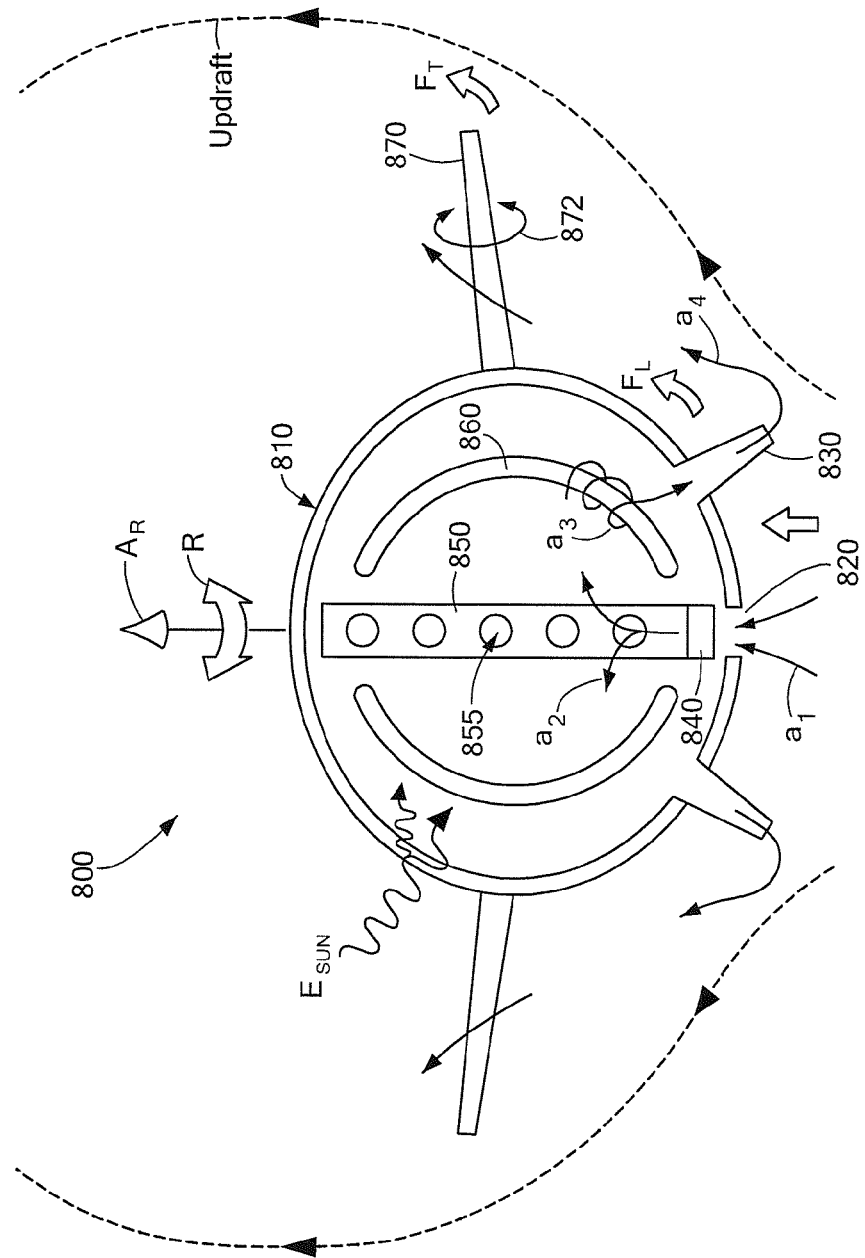
FIG. 8A is a pictorial representation of an exemplary operation of the vehicle embodiment of FIG. 1.

Referring now to FIG. 8A, in exemplary operation a vehicle 800 (as may be similar to vehicle 100 discussed in conjunction with FIG. 1) captures radiant energy (such as the radiant energy of the Sun denoted by $E_{SUN}$) and transfers that energy to a heat-absorbing body 860. The vehicle 800 draws cold air $a_1$ into the vehicle 800 like a fluid through central port 820. A blower 840 accelerates the air $a_1$ and directs it into a distributor 850. The distributor 850 distributes the air $a_2$ throughout the area inside the housing 810 via distributor ports 855. As the $a_3$ flows about the heat-absorbing body 860, it tends to heat the heat-absorbing body 860. The vehicle 800 exhausts the air $a_4$ via radial ports 830.

The exhausted air $a_4$ mixes with and warms the ambient air surrounding the vehicle 800 producing a buoyant plume updraft (generally designated by dashed lines) about the vehicle 800. The force of the updraft acts on the vehicle 800 to provide a lift force $F_L$ on the vehicle 800. The force of the updraft passes by vehicle arms 870 to provide a torque force $F_T$ on the vehicle 800. The arms 870 may be rotated (as designated by reference numeral 872) to act against passing air to control vehicle hover and rotation R about an axis of symmetry $A_R$. Air acting on the arms 870 also contributes to the overall lift force $F_L$.

Figures 8B, 8C:
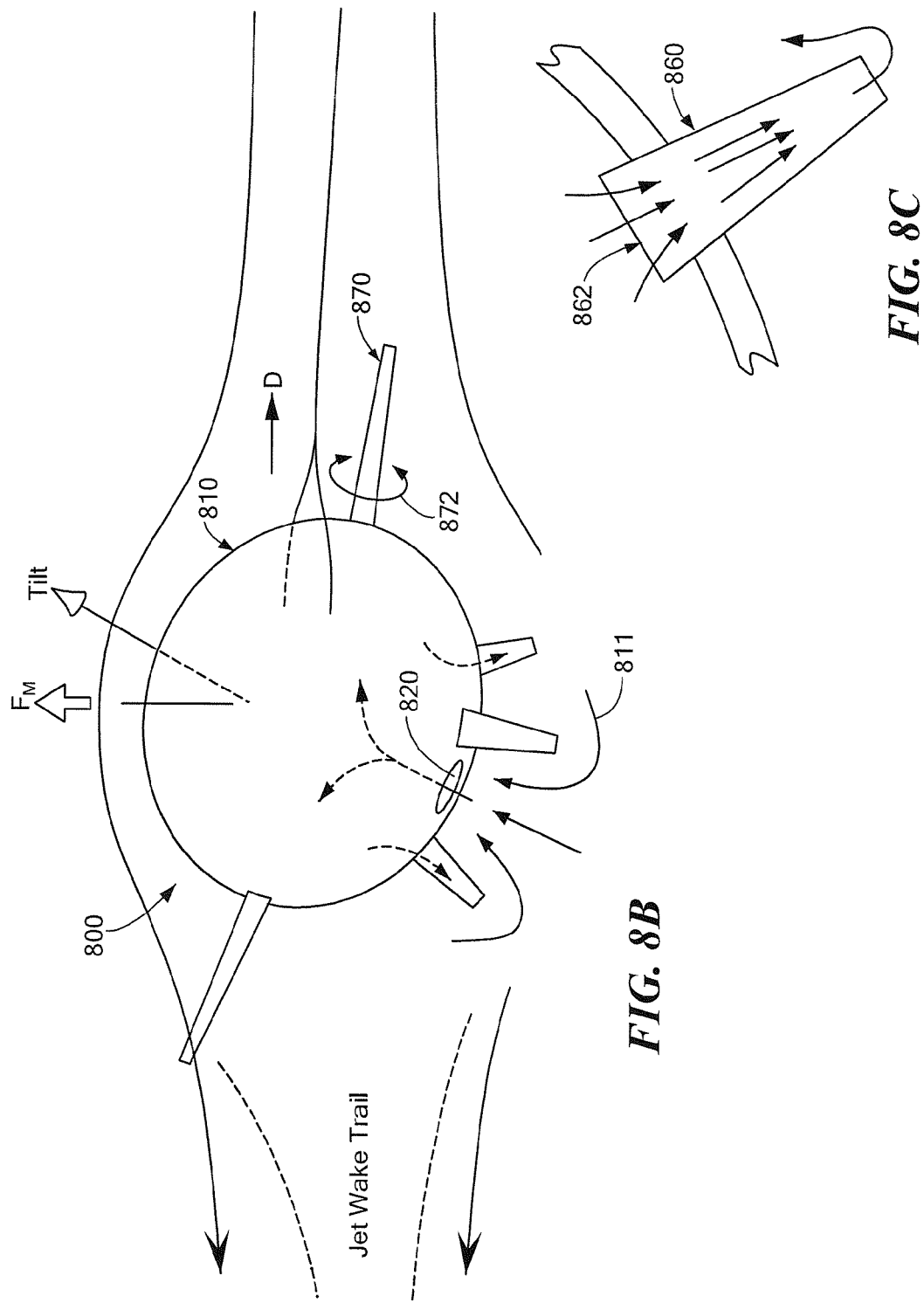
FIG. 8B is a pictorial representation showing further exemplary operations of the vehicle embodiment of FIG. 1.
FIG. 8C is a pictorial representation showing exemplary operations at a radial port of the vehicle embodiment of FIG. 1.

Referring now to FIG. 8B, others forces may act on the vehicle 800. Arm rotation 872 may be controlled to tilt the vehicle 800 and to propel the vehicle 800 in a direction D. As the vehicle 800 rotates, a Magnus force $F_M$ may be produced to provide further vehicle lift. In some embodiments, the arms 870 may be rotated 872 in rapid harmonic succession to control vehicle direction D.

A jet wake trail (denoted by dashed lines) forms behind the moving vehicle 800. The jet wake trail, heated and expanded air inside the vehicle housing 810, and the plume of heated outside air about the vehicle 800 result in a low-density air mass surrounding and trailing the vehicle 800 further enhancing vehicle torque, lift (i.e. buoyancy), and directional control. A boundary layer of outside air 811 is drawn into the central port 820 which tends to reduce drag on the vehicle 800.

Vehicle rotation can advantageously provide more even heating of the inside of the vehicle 800 in that the corresponding rotation of the heat-absorbing body 870 and inside compartment tends to even out radiant energy exposure. Such rotation helps moderate heat collection and can avoid one-sided overheating of the vehicle elements.

Referring now to FIG. 8C, in some embodiments control valves 862 open and close to control an amount of exhausted air, thereby at least partially controlling vehicle lift and torque. As can be seen in FIG. 8C, the radial port 860 is tapered outwardly, which tends to pressurize and accelerate the air as it flows out the radial port 860 and about the vehicle 800.

Figure 9:
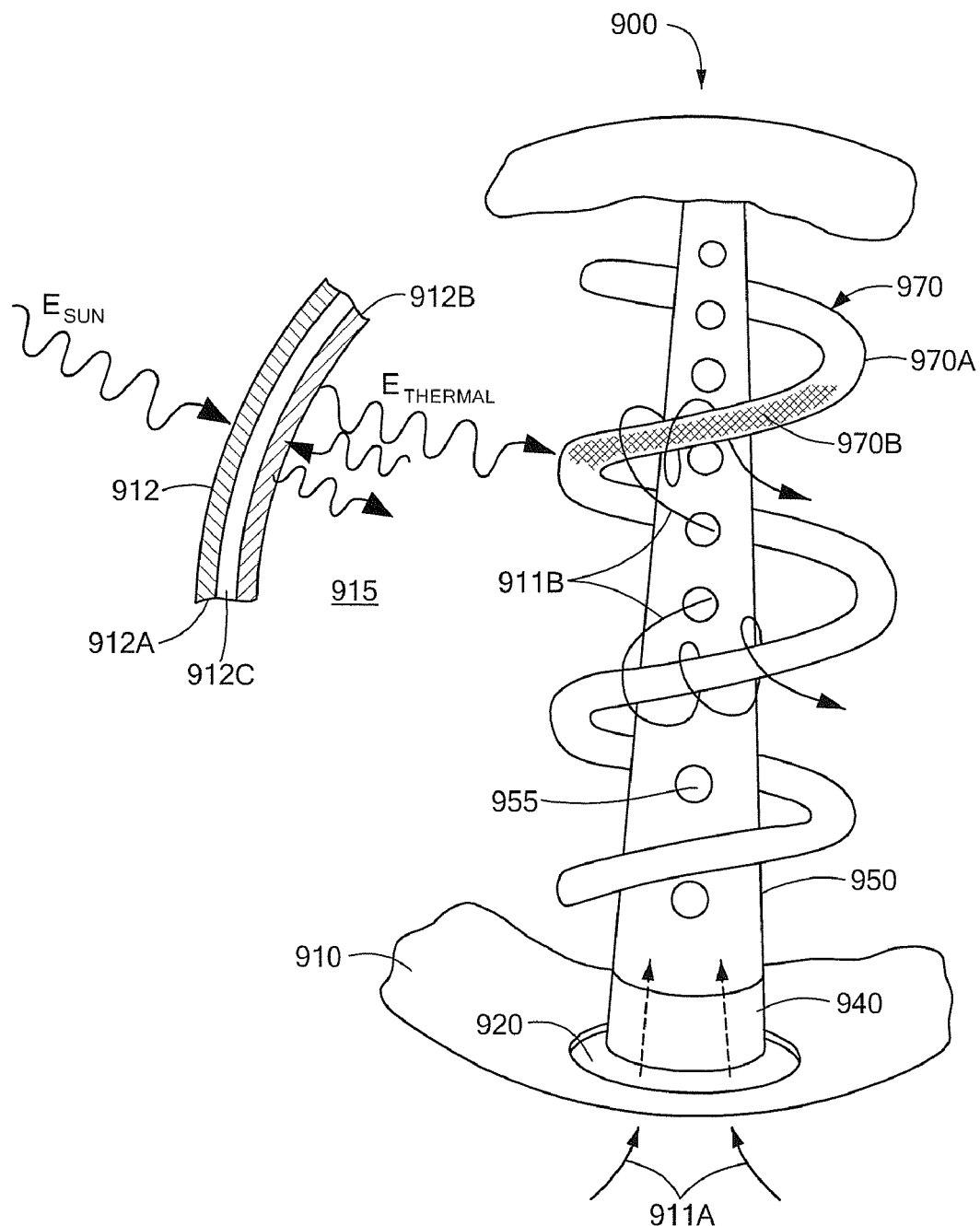
FIG. 9 is a pictorial representation of an exemplary operation of elements of a vehicle according to the systems and methods described herein.

FIG. 9 shows an inside view of a more detailed embodiment 900 of vehicle 100 described in conjunction with FIG. 1. FIG. 9 includes a view of a portion of a housing wall 912 including a first layer of light-transmitting material 912A and a second layer of light-transmitting material 912B. A third layer 912C is formed between the first and second layers 912A, 912B. First and second layers 912A, 912B allow the radiant energy of the Sun ($E_{SUN}$) to pass through the housing wall 912 into an area inside the vehicle (a portion thereof is designated by reference numeral 915). The third layer 912C deflects at least a portion of the transmitted radiant energy in order to prevent heat loss from inside the vehicle 900. The radiant energy (and more particularly thermal energy $E_{THERMAL}$) is received and absorbed by a heat-absorbing body 970, as may be similar to heat-absorbing body 570B described in conjunction with FIG. 5B.

In some embodiments, the heat-absorbing body 970 includes an outer shell 970A configured to absorb thermal energy $E_{THERMAL}$ and to transfer the thermal energy $E_{THERMAL}$ to a material 970B enclosed by the outer shell 970A. The material 970B is configured to store the thermal energy $E_{THERMAL}$. In further embodiments, the outer shell 970A has a dark-colored surface and is flexible to accommodate expansion and contraction of the material 970B as the material 970B heats and cools. Advantageously, expansion and contraction of the outer shell 970A helps to reduce and/or eliminate any folds or creases that may develop and can result in more uniform absorption and/or release of heat throughout the material 970B. The outer shell 970A may optionally include a flexible black rubber and the material 970B may optionally include water. In operation, the water changes phases as it absorbs and/or releases energy. For example, the water may transform from a liquid phase into a gaseous phase (i.e., steam) as it absorbs heat and back into liquid phase as it cools.

Cold air 911A from outside the vehicle housing 910 is received through central port 920. Blower 940 accelerates the cold air 911A into a distributor 950. In some embodiments, the distributor 950 includes an elongated tube that is tapered from one end proximate to the blower 940 to another end proximate to a side of the housing 910 opposing the central port 920. This facilitates even venting of the air 911A over the length of the elongated tube. Ports 952 are formed in the wall of the elongated tube to vent air 911B. The ports 952 may optionally be equally distributed about the elongated tube wall to facilitate even air distribution into the inside area of the housing 915.

As vented air 911B exits the distributor 970, it tends to pass by and come in contact with the heat-absorbing body 970. As can be seen in FIG. 9, the heat-absorbing body 970 is evenly disposed about the distributor 950 to increase and/or maximize air flow over the heat-absorbing body 970. The heat-absorbing body 970 heats the air 911B.

Figure 10:
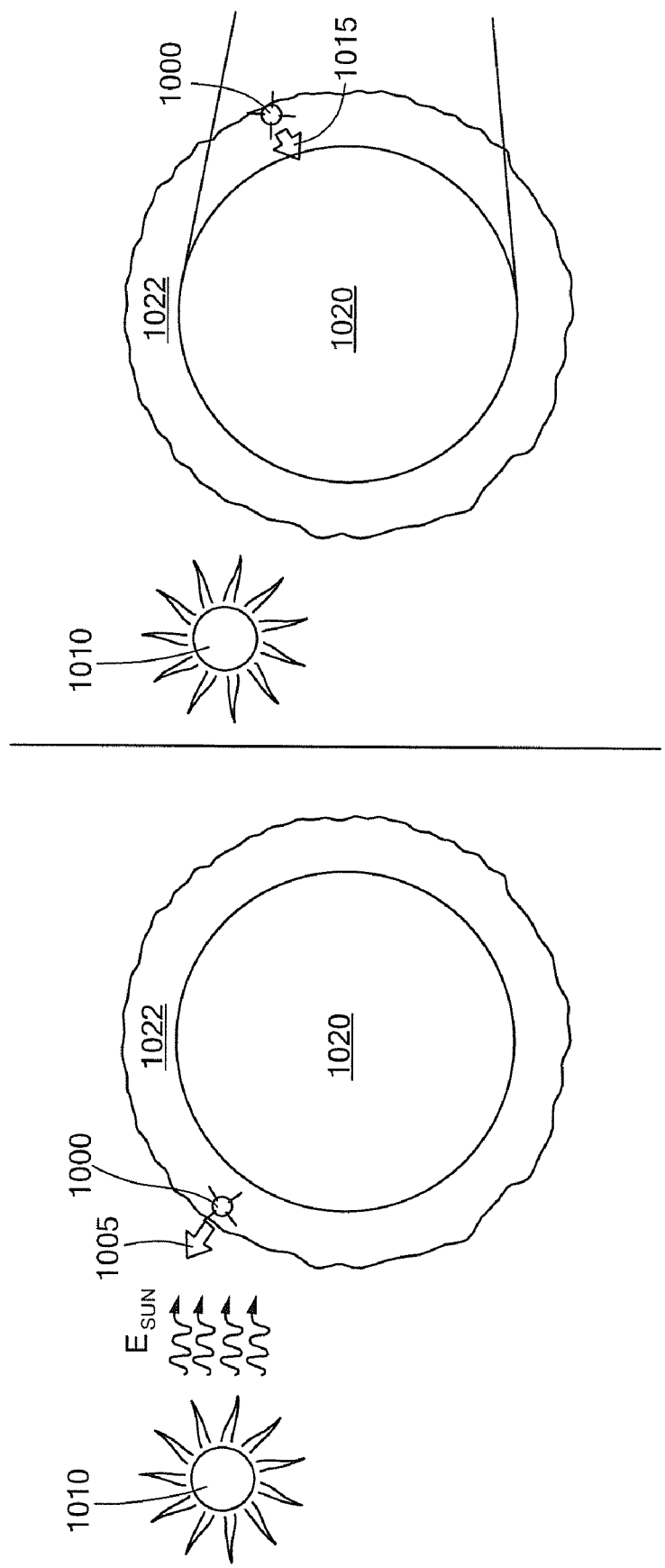
FIG. 10 is a pictorial representation of exemplary daytime and nighttime operation of a vehicle according to the systems and methods described herein.

Referring now to FIG. 10, in a further embodiment a vehicle 1000 (as may be similar to vehicle 100 described in conjunction with FIG. 1) is configured for operation during a first period represented by the left-half of FIG. 10 and a second period represented by the right half of FIG. 10. The first period may be associated with operation of the vehicle 1000 when exposed to the Sun's 1010 radiant energy $E_{SUN}$ and the second period may be associated with operation of the vehicle 1000 when hidden from the Sun's 1010 radiant energy $E_{SUN}$, as may be the case when the Earth 1020 intervenes between the Sun 1010 and the vehicle 1000.

During the first period, the vehicle 1000 receives, absorbs, and stores radiant energy $E_{SUN}$. The vehicle 1000 increases in altitude 1005 above the Earth 1020 as the heat-absorbing body (heated by the Sun) heats air inside the vehicle and the radial ports vent the heated air about the vehicle to provide vehicle lift and torque and to overcome force of gravity on the vehicle 1000. During the second period, the vehicle 1000 releases stored energy. In particular, the heat-absorbing body releases stored energy to continue heating and venting air for propulsion, however, the vehicle 1000 may decrease in altitude 1015 when the provided lift and torque is insufficient to overcome force of gravity on the vehicle 1000. Some or all of the altitude changes during the first and second periods may occur in the Earth's upper atmosphere 1022.

It should be noted that other methods may be used to store daytime energy including, but not limited to, solar cells which recharge batteries engaged at nighttime, and a rise in vehicle altitude representing a potential energy that may be used up as the vehicle descends at nighttime, or a combination thereof. In some embodiments, batteries may provide power to the blower and/or other control mechanisms such as those used to control the arms, central and radial port valves, operate payloads and to maintain proper storage environments.

Figure 11:
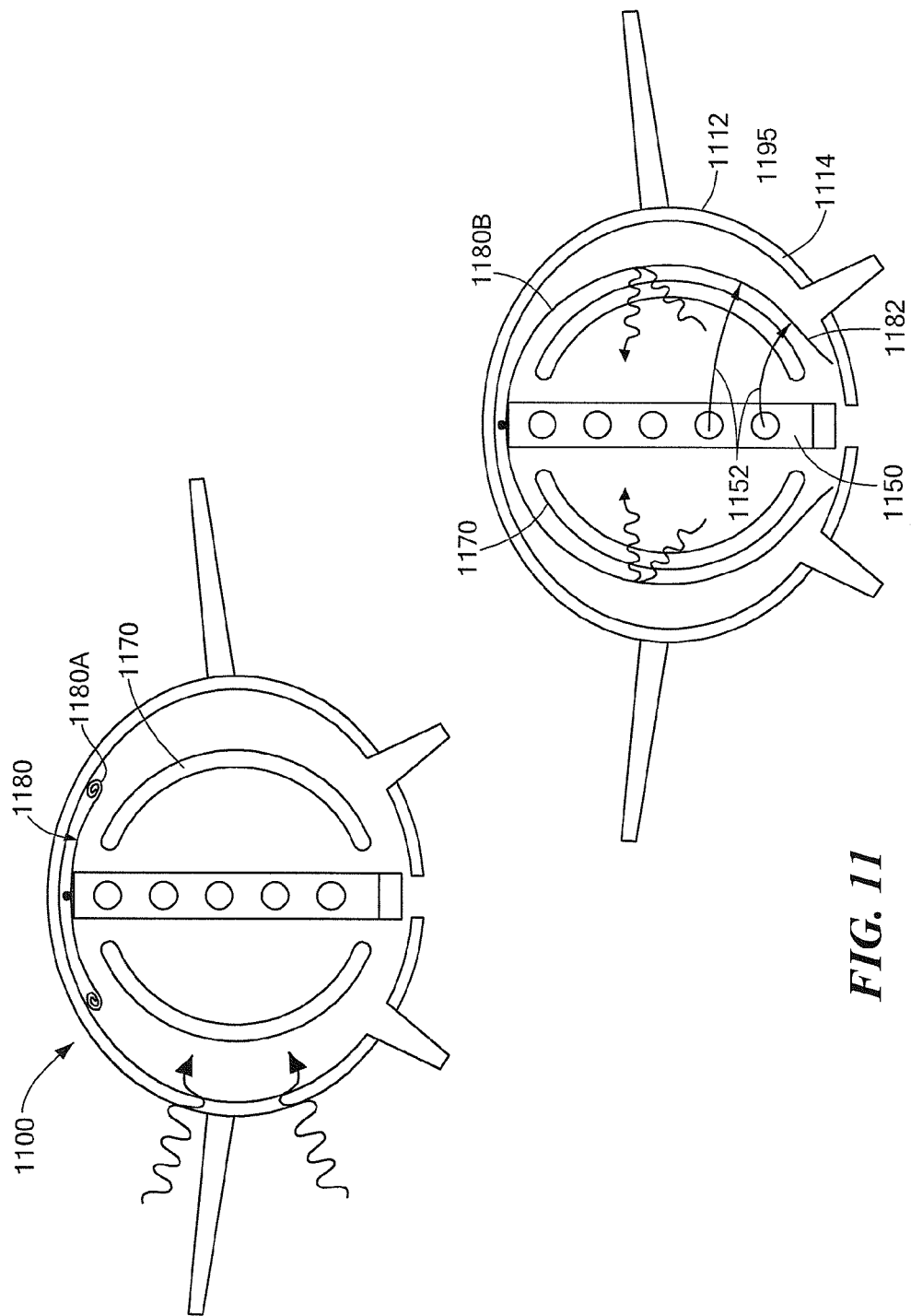
FIG. 11 is a pictorial representation of a cross-sectional view through a central inside portion of a vehicle including an embodiment of a heat-absorbing body cover.

Referring now to FIG. 11, in some embodiments, vehicle 1100 includes a heat-absorbing body cover 1180 configured to decrease heat loss from the heat-absorbing body 1170. The heat-absorbing body cover 1180 is shown in a folded configuration 1180A and in an unfolded configuration 1180B. The folded configuration 1180A may be associated with the first period described above during which the vehicle 1100 receives sun light. In particular, during this period the folded heat-absorbing body cover 1180A does not interfere with heat absorption by the heat-absorbing body 1170.

The unfolded configuration 1180B may be associated with the second period described above during which the vehicle 1100 (i.e. the heat-absorbing body 1170) releases stored energy. Here, the heat absorbing body cover 1180B covers at least a portion of the heat-absorbing body 1170 to reduce and/or eliminate loss of thermal heat that may dissipate into a surrounding environment 1195.

In a further embodiment, a distributor 1150 is configured to extend the heat-absorbing body cover 1180B by forcing air 1152 against a surface 1182 of the heat-absorbing body cover 1180B.

In another embodiment, the heat-absorbing body cover 1180 is extended proximate to the inner surface 1114 of the housing wall 1112. Advantageously, this can form a uniform insulating layer against heat loss to the surrounding environment 1195.

Figure 12:
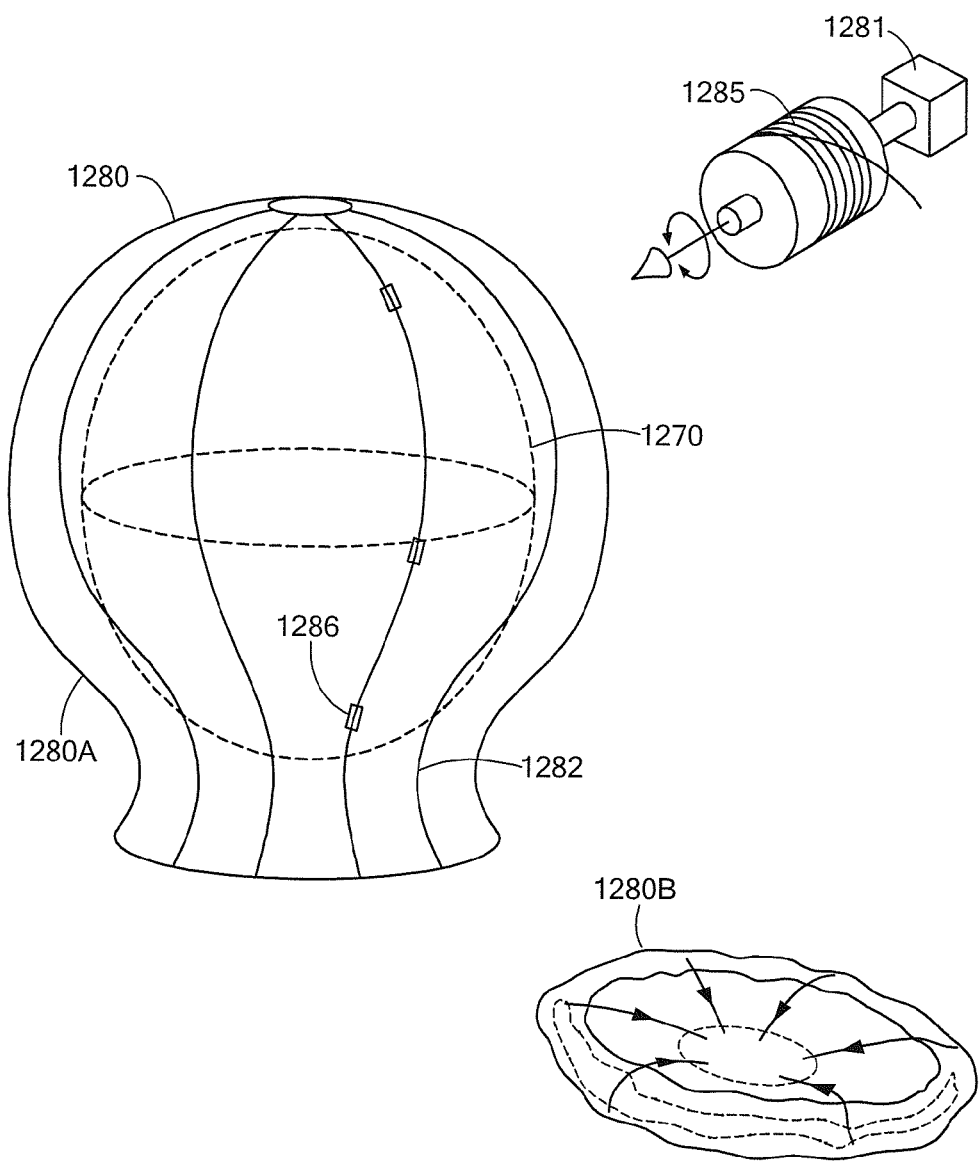
FIG. 12 is a pictorial representation of another embodiment of a heat-absorbing body cover.

Referring now to FIG. 12, in some embodiments, the heat-absorbing body cover 1280 is coupled to elongated elements (an example of which is designated by reference numeral 1282) disposed about the heat-absorbing body cover 1280. The elongated elements 1282 are unwound and wound about motorized spools 1285 to extend (as denoted by configuration 1280A) and retract (as denoted by configuration 1280B) the heat-absorbing body cover 1280. The spools 1285 may be operated by a motor 1281. In a further embodiment, the elongated elements 1282 are at least partially disposed within sleeves 1286 coupled to the heat-absorbing body cover 1280. The inner wall of the sleeves 1286 may include a smooth inner sheath to facilitate winding and unwinding of the elongated elements 1285 through the sleeves 1286. In still a further embodiment, the heat-absorbing body cover 1280 is configured to at least partially enclose a spherically-shaped heat-absorbing body 1270.

In some embodiments, the heat-absorbing body is covered to decrease heat loss and/or to prevent further heating based on a first predetermined condition related to radiant energy about the vehicle. For example, upon reaching a predetermined temperature inside the vehicle (which in some embodiments is measured by an onboard thermometer) the heat-absorbing body cover may be unwound about the heat-absorbing body to reduce and/or eliminate thermal heat loss. The predetermined temperature may be related to an amount of sunlight reaching the vehicle. For example, the temperature inside the vehicle may fall as the vehicle travels within the Earth's shadow and out of the sunlight. This may trigger the predetermined condition causing the vehicle to prepare for nighttime operation (i.e. when little or no sunlight reaches the vehicle). In the alternative, the temperature inside the vehicle may rise as the vehicle travels out of the Earth's shadow and into the sunlight.

In further embodiments, a vehicle descent during one or more nighttime periods and ascent during one or more corresponding daytime periods are compared. In particular, it may be desired to maintain the vehicle's overall altitude by minimizing and/or eliminating a difference between an ascent and a descent during these periods.

Figure 13:
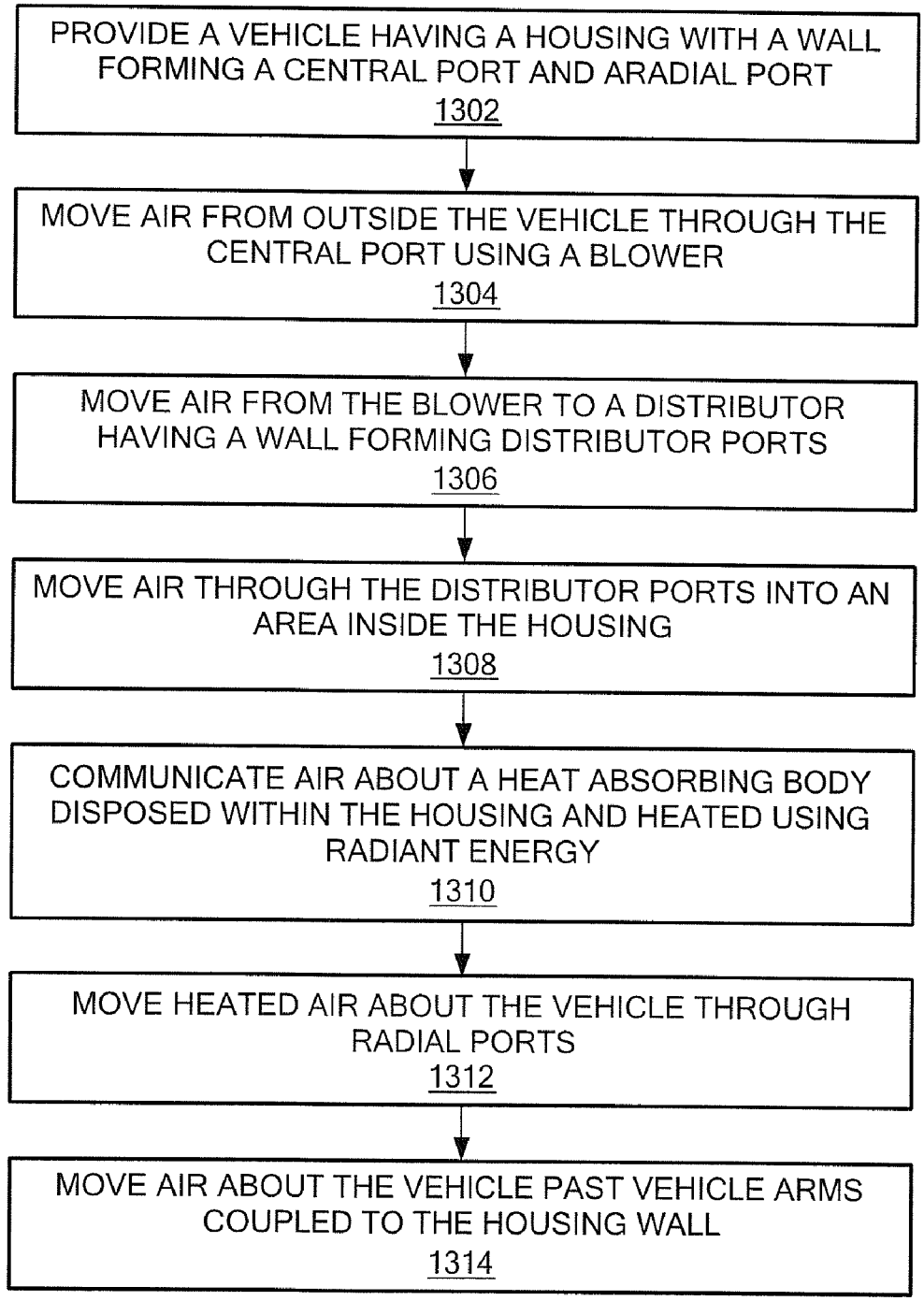
FIG. 13 is a flow diagram of an embodiment of a method of vehicle hover.

Referring now to FIG. 13, in one aspect, a method 1300 of vehicle hovering includes at 1302 providing a vehicle having a housing with a wall forming a central port and a radial port, at 1304 moving air from outside a vehicle through the central port using a blower disposed proximate to the central port, at 1306 moving air from the blower into a distributor having a wall forming distributor ports, at 1308 moving air through the distributor ports into an area inside the housing, at 1310 communicating air about a heat-absorbing body disposed within the housing and heated using radiant energy, at 1312 moving heated air through the radial port about the vehicle, and at 1314 moving air about the vehicle past at least one arm coupled to the housing wall.

In a further embodiment, the method 1300 includes providing a thrust force to lift the vehicle and a torque force to rotate the vehicle about a central axis and moving air about the vehicle past at least one arm to provide a portion of the thrust force and a portion of the torque force.

In still other embodiments, the method 1300 includes communicating radiant energy from outside the vehicle into the housing through a transparent material. In these embodiments, a housing wall includes a first transparent layer, a second transparent layer, and an insulating layer disposed between the first and second transparent layers. The first and second transparent layers communicate radiant energy inside the housing and the insulating layer reduces heat loss from inside the housing.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims.

All publications and references cited herein are expressly incorporated herein by reference in their entirety.

What is claimed is:

1. A vehicle comprising:
   a housing having a wall with a central port and radial port formed at a lower portion of the housing;
   a blower disposed within the housing to move air through the central port;
   a distributor coupled to the blower to distribute air inside the housing wherein the distributor comprises:
      a spherically shaped inner housing having a wall forming a plurality of ports to move air centrally inside the housing; and
      an elongated tube coupled at one end to the blower and at an opposite end to the spherically shaped inner housing;
   a heat-absorbing body disposed within the housing to absorb thermal energy; and
   at least one arm coupled to the housing.

2. The vehicle of claim 1, wherein the housing is spherical.

3. The vehicle of claim 1, wherein the central port is formed at the bottom end of the housing and is circular having a center point coincident with an axis of symmetry of the housing about which the vehicle rotates.

4. The vehicle of claim 1, wherein the blower includes an axial fan.

5. The vehicle of claim 1, further comprising:
   an air supply tube extending outward from a bottom end of the housing to provide heated air to the central port.

6. The vehicle of claim 1, where in the radial port is a plurality of radial ports.

7. The vehicle of claim 1, wherein the arm is coupled to the outer surface of the housing wall.

8. The vehicle of claim 1, wherein the arm is a plurality of arms.

9. The vehicle of claim 1, wherein the housing wall comprises a material capable of absorbing energy of the sun.

10. The vehicle of claim 9, wherein the housing wall material is further capable of insulating the area inside the housing from loss of thermal energy.

11. The vehicle of claim 1, wherein the housing wall comprises:
    a first transparent layer;
    a second transparent layer; and
    a thermal insulating layer disposed between the first and second transparent layers.

12. The vehicle of claim 11, wherein at least one of the first or second transparent layers is comprised of at least one of a clear plastic, glass, polycarbonate, or acrylic.

13. The vehicle of claim 1, wherein the distributor has a wall forming a plurality of ports to move air inside the housing.

14. The vehicle of claim 13, wherein the distributor includes an elongated tube having a longitudinal axis coincident with an axis of symmetry of the housing about which the vehicle rotates.

15. The vehicle of claim 14, wherein the elongated tube is tapered from an end of the elongated tube proximate to the blower to a portion of the elongated tube distal to the blower.

16. The vehicle of claim 1, wherein the heat-absorbing body is configured to store thermal energy and to release thermal energy.

17. The vehicle of claim 16, wherein the heat-absorbing body comprises:
    a tree structure configured to absorb thermal energy inside the housing.

18. The vehicle of claim 16, wherein the heat-absorbing body comprises:
    a web structure configured to absorb thermal energy inside the housing.

19. The vehicle of claim 18, wherein the web structure comprises:
    a structural body distributed evenly within the housing; and
    a heat-absorbing material coupled to the structural body.

20. The vehicle of claim 1, wherein the heat-absorbing body houses a material to store thermal energy and release thermal energy into the housing.

21. The vehicle of claim 20, wherein the material includes water.

22. The vehicle of claim 1, wherein the radial port comprises an elongated tube extending from the outer surface of the housing wall to direct air about the vehicle.

23. The vehicle of claim 22, wherein the elongated tube tapers outwardly from the housing wall.

24. The vehicle of claim 1, further comprising:
    a heat-absorbing body cover configured to decrease heat loss from the heat-absorbing body.

25. The vehicle of claim 24, further comprising:
    a plurality of elongated elements coupled to the heat-absorbing body cover, wherein the elongated elements are unwound and wound about a plurality of motorized spools to extend and retract the heat-absorbing body cover.

26. The vehicle of claim 24, wherein the distributor is configured to extend the heat-absorbing body cover by forcing air against a surface of the heat-absorbing body cover.

27. The vehicle of claim 26, wherein the heat-absorbing body cover is extended proximate to the inner surface of the housing wall.

28. A method of vehicle hovering, comprising:
    providing a vehicle having a housing with a wall forming a central port and a radial port wherein the housing wall comprises a first transparent layer, a second transparent layer, and an insulating layer disposed between the first and second transparent layers, further comprising:
       communicating radiant energy inside the housing through the first and second transparent layers; and
       reducing heat loss from inside the housing using the insulating layer;
    moving air from outside a vehicle through the central port using a blower disposed proximate to the central port;
    moving air from the blower into a distributor having a wall forming at least one distributor port;
    moving air through the at least one distributor port into an area inside the housing to communicate air about a heat-absorbing body disposed within the housing and heated using radiant energy;
    moving heated air through the radial port about the vehicle; and
    moving air about the vehicle past at least one arm coupled to the housing wall.

29. The method of claim 28, wherein said moving air from outside the vehicle further comprises:
    forming the central port at a bottom end of the housing wall and aligning the center port with a central axis of the vehicle.

30. The method of claim 28, wherein said moving air from the blower into the distributor further comprises:
    moving air into an elongated tube having a longitudinal axis coincident with a central axis of the vehicle and a radius tapering from a bottom end of the housing to a top end of the housing.

31. The method of claim 28, wherein the heat-absorbing body further comprises a material to store and release the radiant energy and said communicating air about the heat-absorbing body further comprises:
   cooling the heat-absorbing body.

32. The method of claim 28, wherein said moving heated air through the radial port about the vehicle further comprises:
   moving heated air through an elongated tube having one end coupled to the housing wall and tapering distally from the one end.

33. Me method of claim 28, wherein the housing wall comprises a transparent material, further comprising:
   communicating radiant energy from outside the vehicle into the housing through the transparent material.

34. The method of claim 28, wherein said moving heated air through the radial port about the vehicle further comprises:
   providing a thrust force to lift the vehicle and a torque force to rotate the vehicle about a central axis.

35. The method of claim 34, wherein said moving air about the vehicle past at least one arm further comprises:
   providing a portion of the thrust force and a portion of the torque force.

36. The method of claim 28, further comprising:
   covering the heat-absorbing body to decrease heat loss based upon a first predetermined condition related to radiant energy about the vehicle; and
   uncovering the heat-absorbing body based upon a second predetermined condition related to radiant energy about the vehicle.

37. The method of claim 36, wherein the first predetermined condition corresponds to a first temperature inside the housing and the second predetermined condition corresponds to a second temperature inside the housing.

38. The method of claim 28, further comprising:
   increasing an altitude of the vehicle during a first period when the heat-absorbing body absorbs thermal energy.

39. The method of claim 38, further comprising:
   decreasing an altitude of the vehicle during a second period when the heat-absorbing body releases thermal energy.

40. The method of claim 39, further comprising:
   comparing an increase an altitude during the first period with a decrease in altitude during the second period.

41. The method of claim 40, wherein said comparing further comprises:
   decreasing a difference between the increase in altitude during the first period and the decrease in altitude during the second period to reduce a net loss in vehicle altitude.

42. A rotorcraft comprising:
   a spherical housing having a wall with a central port and radial port formed at a lower portion of the housing, the wall to communicate radiant energy and comprising:
      a transparent outer layer;
      a transparent inner layer; and
      an insulating layer disposed between the transparent outer layer and the transparent inner layer;
   a blower disposed within the housing to move air through the central port;
   a heat-absorbing body disposed within the housing to absorb a portion of communicated radiant energy as thermal energy, comprising:
      a heat-absorbing material to absorb thermal energy; and
      a phase-changing material coupled to the heat-absorbing material to store and release thermal energy; and
   at least one arm coupled to the housing.

43. The rotorcraft of claim 42, wherein the heat-absorbing body includes an opening proximate to the blower to distribute air about the heat-absorbing body to cool the heat-absorbing body, the radial port communicates air about the vehicle to provide a portion of a vehicle thrust to lift the vehicle and a portion of a vehicle torque to rotate the vehicle about a central axis, and air about the vehicle acts on the at least one arm to provide another portion of the vehicle thrust and another portion of the vehicle torque.

* * * * *